(12) United States Patent
Ducharme et al.

(10) Patent No.: US 11,449,978 B2
(45) Date of Patent: *Sep. 20, 2022

(54) CASED GOODS INSPECTION SYSTEM AND METHOD

(71) Applicant: Symbotic Canada ULC, Montréal (CA)

(72) Inventors: Marc Ducharme, Boucherville (CA); Robert Jodoin, Montréal (CA); Benoit Larouche, Montréal (CA); Sylvain-Paul Morency, Laval (CA); Christian Simon, Laval (CA)

(73) Assignee: Symbolic Canada ULC

( * ) Notice: Subject to any disclaimer, the term of this patent is extended or adjusted under 35 U.S.C. 154(b) by 0 days.

This patent is subject to a terminal disclaimer.

(21) Appl. No.: 17/216,803

(22) Filed: Mar. 30, 2021

(65) Prior Publication Data

US 2021/0327044 A1 Oct. 21, 2021

Related U.S. Application Data

(63) Continuation of application No. 15/416,922, filed on Jan. 26, 2017, now Pat. No. 10,964,007.
(Continued)

(51) Int. Cl.
*G06T 7/00* (2017.01)
*G01B 11/04* (2006.01)
(Continued)

(52) U.S. Cl.
CPC ............ *G06T 7/0004* (2013.01); *B65G 15/00* (2013.01); *G01B 11/04* (2013.01); *G06T 5/50* (2013.01);
(Continued)

(58) Field of Classification Search
CPC G06T 7/0004; G06T 7/70; G06T 7/62; G06T 5/50; G06T 2207/30164;
(Continued)

(56) References Cited

U.S. PATENT DOCUMENTS 42,430 A 4/1864 Boyle
490,328 A 1/1893 Wallenstein
(Continued)

FOREIGN PATENT DOCUMENTS

CA 2110876 6/1994
CA 2270859 11/1999
(Continued)

*Primary Examiner* — Boubacar Abdou Tchoussou
(74) *Attorney, Agent, or Firm* — Perman & Green, LLP

(57) ABSTRACT

A method of inspecting cased goods includes advancing at least one case of goods on a conveyor, generating an illumination sheet of parallel illuminating rays with at least one electromagnetic source, and capturing an image, formed by the illumination sheet passing through a diffuser with at least one camera located so as to capture illumination from diffused parallel rays of the light sheet, where the image case embodies a goods image that is generated by the case goods moving between the light source and the at least one camera, where part of the parallel sheet of light is at least partially blocked by the case of goods, thus generating a gray level image.

27 Claims, 10 Drawing Sheets

Related U.S. Application Data

(60) Provisional application No. 62/287,128, filed on Jan. 26, 2016.

(51) Int. Cl.
| | | |
|---|---|---|
| *G06T 7/62* | (2017.01) | |
| *G06T 7/70* | (2017.01) | |
| *B65G 15/00* | (2006.01) | |
| *G06T 5/50* | (2006.01) | |
| *H04N 5/225* | (2006.01) | |
| *H04N 5/04* | (2006.01) | |

(52) U.S. Cl.
CPC .............. *G06T 7/0006* (2013.01); *G06T 7/62* (2017.01); *G06T 7/70* (2017.01); *H04N 5/2256* (2013.01); *G06T 2207/10016* (2013.01); *G06T 2207/30164* (2013.01); *H04N 5/04* (2013.01)

(58) Field of Classification Search
CPC .......... G06T 2207/10016; B65G 15/00; H04N 5/2256; H04N 5/04; G01B 11/04
See application file for complete search history.

(56) References Cited

U.S. PATENT DOCUMENTS

| | | | |
|---|---|---|---|
| 4,929,843 A | | 5/1990 | Chmielewski, Jr. et al. |
| 4,972,091 A | * | 11/1990 | Cielo ................. G01N 21/8901 |
| | | | 250/559.18 |
| 5,083,867 A | | 1/1992 | Burk |
| 5,280,170 A | | 1/1994 | Baldwin |
| 5,422,861 A | | 6/1995 | Stringer et al. |
| 5,606,534 A | | 2/1997 | Stringer et al. |
| 5,636,028 A | | 6/1997 | Stringer et al. |
| 5,699,161 A | | 12/1997 | Woodworth |
| 5,831,737 A | | 11/1998 | Stringer et al. |
| 5,850,370 A | | 12/1998 | Stringer et al. |
| 5,864,404 A | | 1/1999 | Amorosi |
| 5,903,354 A | | 5/1999 | Bengala et al. |
| 5,917,602 A | | 6/1999 | Bonewitz et al. |
| 6,049,386 A | | 4/2000 | Stringer et al. |
| 6,061,645 A | | 5/2000 | Bengala et al. |
| 6,260,001 B1 | | 7/2001 | Bengala |
| 6,298,009 B1 | | 10/2001 | Stringer |
| 6,323,954 B1 | | 11/2001 | Halter |
| 6,442,503 B1 | | 8/2002 | Bengala |
| 6,611,787 B2 | | 8/2003 | Stringer et al. |
| 6,775,011 B2 | | 8/2004 | Gagliano |
| 6,783,068 B2 | | 8/2004 | Hecht |
| 6,850,464 B1 | | 2/2005 | Carlsruh et al. |
| 6,944,324 B2 | | 9/2005 | Tran et al. |
| 6,975,410 B1 | * | 12/2005 | Sturgill .................. G01B 11/06 |
| | | | 356/631 |
| 7,098,409 B2 | | 8/2006 | Liang et al. |
| 7,277,187 B2 | | 10/2007 | Smith et al. |
| 8,223,200 B1 | | 7/2012 | Benttine et al. |
| 8,913,254 B1 | * | 12/2014 | Daley .................... G01B 11/06 |
| | | | 356/632 |
| 11,104,465 B2 | * | 8/2021 | Spindler ............... B65B 43/126 |
| 2010/0260378 A1 | | 10/2010 | Noy et al. |
| 2011/0154969 A1 | | 6/2011 | Weber |
| 2014/0331617 A1 | | 11/2014 | Napravnik |
| 2015/0059290 A1 | * | 3/2015 | Ewert ..................... B65B 11/48 |
| | | | 53/432 |
| 2015/0360877 A1 | | 12/2015 | Shin |

FOREIGN PATENT DOCUMENTS

| | | |
|---|---|---|
| EP | 0604172 | 12/1993 |
| EP | 2801533 | 5/2014 |
| JP | 53042093 | 4/1973 |
| JP | 0244088 | 2/1990 |
| JP | 06258253 | 9/1994 |
| JP | 0787300 | 3/1995 |
| JP | 2005098944 | 4/2005 |
| JP | 2006177742 | 7/2006 |
| JP | 2008213907 | 9/2008 |
| JP | 2009290661 | 12/2009 |
| JP | 2011085498 | 4/2011 |
| JP | 2012088082 | 5/2012 |
| JP | 2013073452 | 4/2013 |
| JP | 2013166565 | 8/2013 |
| JP | 2014109464 | 6/2014 |
| JP | 2002513927 | 5/2020 |
| WO | 9957541 | 11/1999 |
| WO | 2008107892 | 9/2008 |

\* cited by examiner

CASED GOODS INSPECTION SYSTEM AND METHOD

CROSS REFERENCE TO RELATED APPLICATIONS

This application is a continuation of U.S. application Ser. No. 15/416,922, filed Jan. 26, 2017, (now U.S. Pat. No. 10,964,007), which is a non-provisional of and claims the benefit of U.S. Provisional Patent Application No. 62/287,128, filed on Jan. 26, 2016, the disclosures of which are incorporated herein by reference in their entireties.

1. TECHNICAL FIELD

This invention relates to product inspection, and in particular to cased goods inspection systems and methods therefor.

2. BACKGROUND

There is a need to improve cased goods inspection systems and methods.

The other cased good inspection systems are mostly built on LED curtain lighting. The LEDs in these arrays have a considerable spacing between them (>5 mm), so they only produce a 'sampled' image, instead of imaging the cased goods completely. The other main disadvantage of LED light curtains is the lack of transparency measurement. The light curtains only detect the presence of material in its path. They are therefore unable to differentiate a piece of shrink wrap from an opaque cardboard piece.

Other approaches use the laser triangulation method. This approach is fast, precise and robust, but is sensitive to reflective surfaces like shrink wraps. Also, like the previous method, it cannot differentiate a piece of shrink wrap from cardboard.

Therefore, there is a need in the market for a new approach that integrates speed, resolution, robustness and cost for inspection cased goods.

SUMMARY

In accordance with an aspect of the proposed solution there is provided a cased goods inspection system adapted to determine the presence of product being scanned and to obtain at least "real box", "max box", "max bulge", "orientation angle", "distance from one side of the conveyor", etc. measurements.

In accordance with another aspect of the proposed solution there is provided a cased goods inspection system adapted to reject or accept product based on allowable dimensions applied at least to "real box", "max box" and "max bulge" measurements.

In accordance with a further aspect of the proposed solution there is provided a cased goods inspection system with sensor(s) adapted to sense incident light intensity variations, and detector(s) detecting and accounting for such incident light intensity variations experienced by a vision system of the cased goods inspection system to reduce false product detection and false measurements including rejection of adverse effects to Measurement accuracy from opaque or translucent materials packaging such as plastic shrink wrap.

In accordance with a further aspect of the proposed solution there is provided a cased goods inspection system adapted to identify the presence of debris on a window of a camera subsystem of the cased goods inspection system to reduce false product detection or false measurements.

In accordance with a further aspect of the proposed solution there is provided a cased goods inspection system adapted to inspect an array of goods at least partially encased in shrink wrap packaging.

In accordance with a further aspect of the proposed solution there is provided a cased goods inspection system adapted to inspect an array of goods having complex shapes encased in shrink wrap packaging.

The use of the word "a" or "an" when used in conjunction with the term "comprising" in the claims and/or the specification may mean "one", but it is also consistent with the meaning of "one or more", "at least one", and "one or more than one". Similarly, the word "another" may mean "at least a second" or "more".

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

BRIEF DESCRIPTION OF THE DRAWINGS

The invention will be better understood by way of the following detailed description of embodiments of the proposed solution with reference to the appended drawings, in which.

DETAILED DESCRIPTION

A proposed cased goods inspection system will now be described with reference to illustrative embodiments thereof.

System Input and Output

Figure 1:
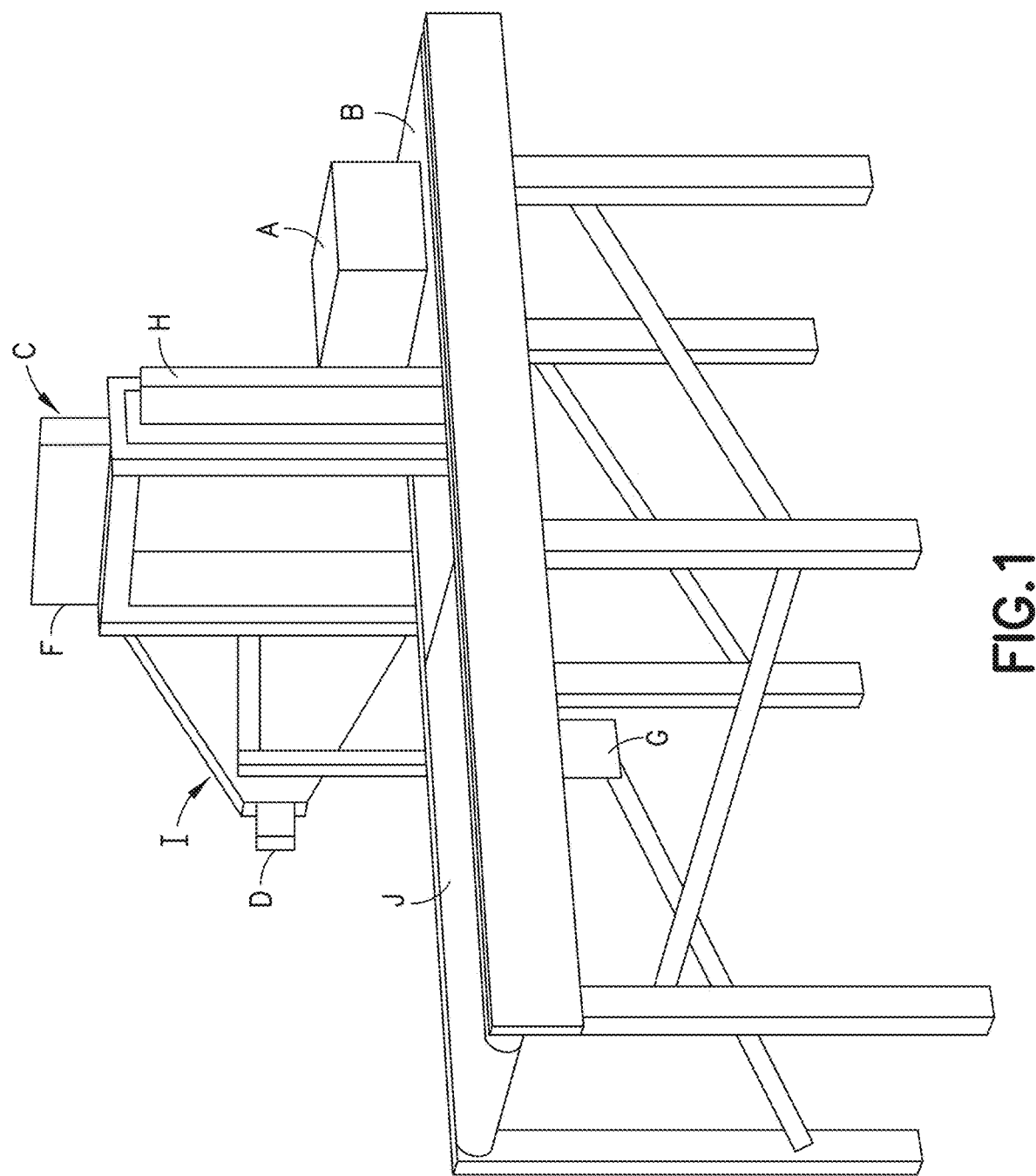
FIG. 1 is a schematic diagram illustrating a perspective view of a case inspection system in accordance with the proposed solution.

With reference to FIG. 1, as an input, the proposed case inspection system receives products A which arrive individually on a conveyor B in any orientation and position. For example, conveyor B can be a conveyor belt. The output of the case inspection system includes various (quantitative) measurements which characterize each product, for example a case of goods. Examples of quantitative measurements include: "real box", "max box", "max bulge", "orientation angle", "distance from one side of the conveyor", etc.

Figure 2:
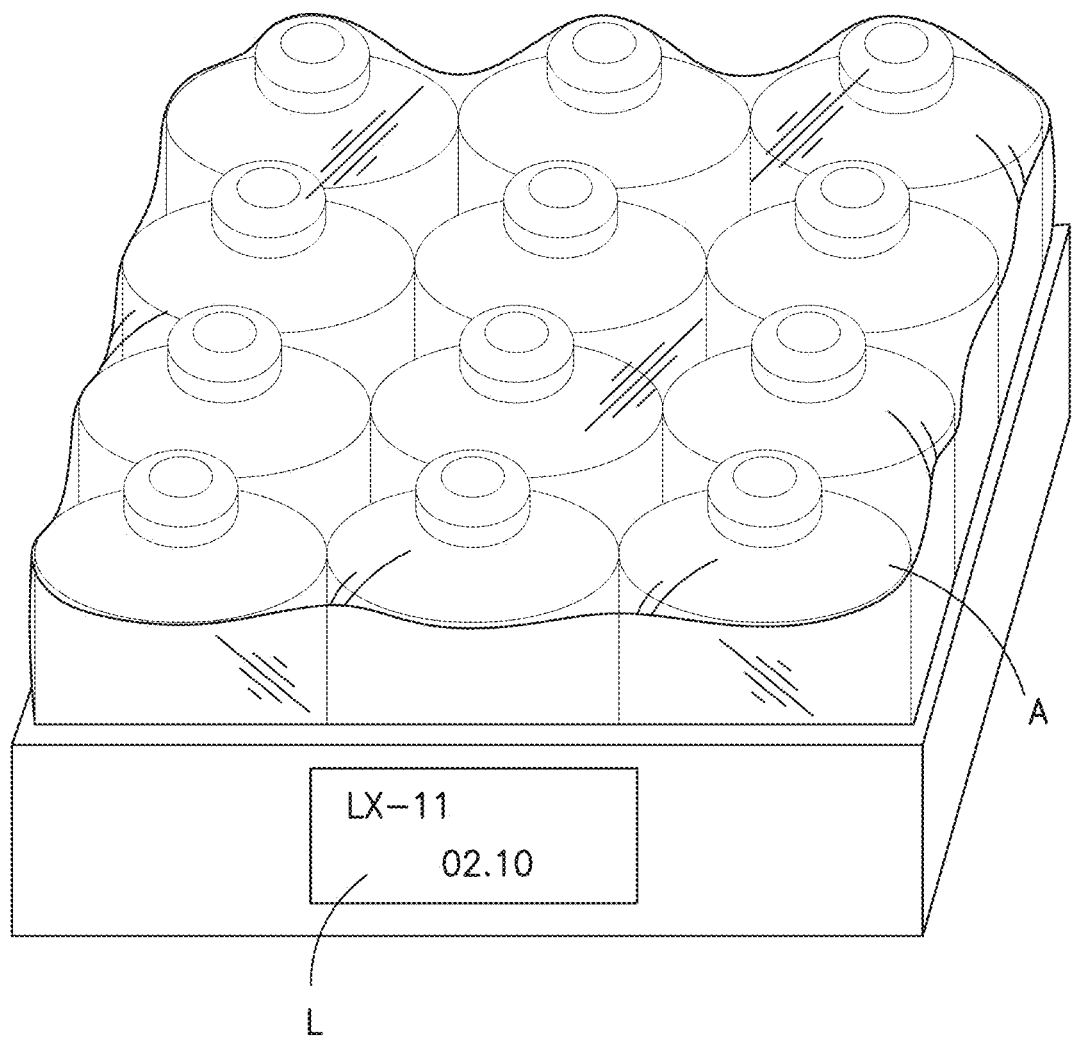
FIG. 2 is a diagram illustrating a perspective view of an example of a product case inspected in accordance with the proposed solution.

One example of a case of good(s) is a shrink wrapped product and/or product container or array of one or more product containers or product(s) included in shrink wrap as illustrated in FIG. 2. The term "product" should be construed herein as including any type of consumer good(s) in any type of packaging, such as, without limitations, closed cartons, totes, open top cartons, trays with or without shrink wrapped film, bags and pouches, etc. The dimensions of "input" product A may vary greatly between different types of product. Typical dimensions (W×L×H) can be between 4"×4"×2" and 25"×30"×30". Though the example in FIG. 2 is illustrated as having a general hexahedron shape, the product(s) and/or product case may have any desired 3-D shape as cylindrical, curvilinear, pyramidal, ovoid, etc., and one or more surface(s) of any side may be curved or pitched with respect to another side or another surface on the same side.

System Components

With reference to FIG. 1, the case inspection system can include: input conveyor B, a vision system generally labeled as C, a controller D, an output (human machine interface) screen E (FIGS. 8 to 12) and an output conveyor J.

At least some of these system components will now be described in more detail.

Input conveyor B transports incoming products from external equipment. Conveyor B, for example, includes a mat top high-grip conveyor, but can be of any other form (such as roller bed) allowing moving product A into and through the vision system C with reduced vibration and slippage. For example, acceptable vibration can be under a vibration threshold limit.

The output conveyor J transports product A away from vision system C. Conveyor J, for example, includes a mat top low-grip conveyor, but can be of any other form allowing moving product A through and away from the vision system C with reduced vibration. For example, acceptable vibration can be under a vibration threshold limit.

Vision system C is positioned, at least in part, around and about the conveyors B and/or J for measuring the top and side profiles of product A.

In accordance with one aspect, the vision system C can includes a first light source F which emits a (first) sheet of light (not shown), e.g. a continuous plane of substantially parallel light, within a small gap between conveyors B and J. For example first light source F can be located above conveyors B and J as otherwise shown in FIG. 1.

The vision system further includes a first camera system G located for example opposite first light source F with respect to conveyors B and J, positioned to receive the parallel light emitted by first light source F. For example if first light source F is located above conveyors B and J, then the first camera system G is located below conveyors B and J. In other aspects, the orientation of first light source and first camera system may be rotated as desired about the axis defined by the direction of travel of conveyors B and J maintaining the relationship between light source emitter and camera system receiver.

A second light source H emits a (second) sheet of light, i.e. a continuous plane of substantially parallel light, over the small gap between conveyors B and J. For example second light source H can be located on one side of conveyors B and J (transmission of the parallel light beams of the second sheet being substantially (orthogonal to the first plane).

A second camera system I is correspondingly located to receive illumination from (e.g. opposite) second light source H with respect to conveyors B and J, positioned to receive the parallel light emitted by second light source H. For example if second light source H is located to one side of conveyors B and J, then second camera system I is located to the other opposite side of conveyors B and J.

A controller or any other device or system (local or remote) operably coupled to the system, includes a computer program that is capable of registering and analyzing image data to calculate desired measurements of products A.

Without limiting the invention, at least one light source F or H can include a light shaper LS made with lenses or mirrors. The light source itself can be a laser, a LED or other types like gas lamp. In other aspects the source may be any other device of EM radiation suitable for EM illumination of a target object and which reflection or transmission, of which may be captured by an appropriate imaging system generating an image or pseudo image of the illuminated target object.

The collimated output beam provides the sheet of parallel propagating light which, when impeded by the product A, casts an orthographic projection shadow onto an input window of the corresponding camera system G or I opposite the corresponding light source F or H. In this regard, the camera system G or I receives an incident collimated input beam output by the corresponding light source.

In the illustrated example, both camera systems G and I include a camera CAM, an optional mirror MIR and a diffusion screen DIF. The optional mirror MIR is for example employed in reducing the footprint of the overall cased goods inspection system by redirecting the sheet of light parallel to the conveyor. The diffusion screen DIF, which may be any suitable type illumination diffuser, is an example of an input beam shaper spreading the input beam by diffusing the parallel light incident thereon from corresponding light sources F or H so that the corresponding camera G and I (e.g. the camera imaging array having a desired predetermined width, defined structurally or by the controller so that the array) can capture and digitize diffused light from the full width of the corresponding light sheet emitted by the light source. As may be realized, the camera(s) G, I may image a case(s) and/or products within the full width of the light sheets (which as may be further realized may span the lateral bounds of the conveyor and height of the inspection system opening).

In order to reduce the light footprint or to be able to use a less powerful laser class light source, smaller sheets of parallel light can be used, with overlap to maintain continuity and cover the larger surface. A calibration procedure can be used to realign these separate sheets as a single one by software.

Operation

Figure 3:
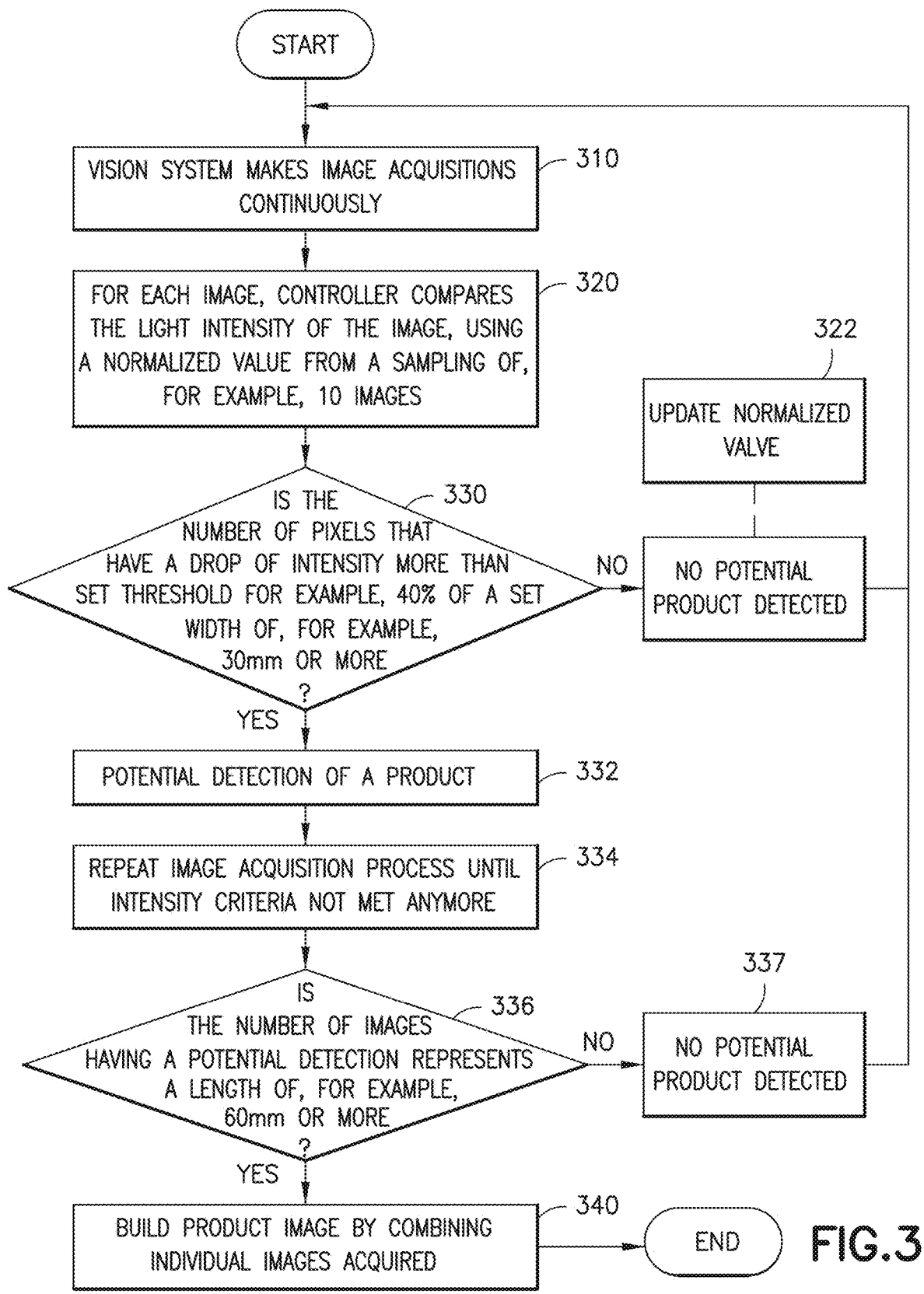
FIG. 3 is a schematic chart illustrating a product detection process flow diagram in accordance with the proposed solution.

For example, in operation, a product A arrives on conveyor B in any orientation and position. Without limiting the invention, the position includes a distance or gap from one side of conveyor B. FIG. 3 illustrates a product measurement process.

Figure 4:
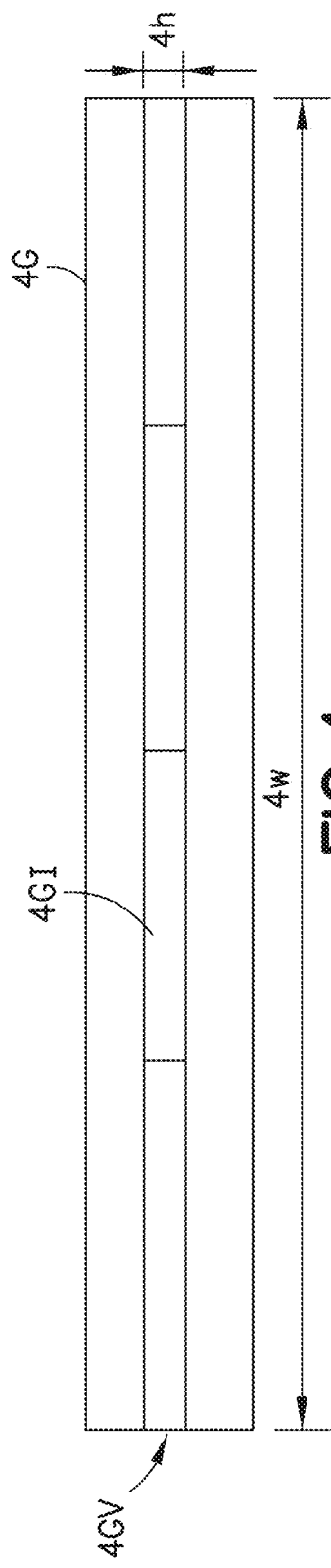
FIG. 4 is a diagram illustrating a general acquired image without product seen by a camera vision system in accordance with the proposed solution.
Figure 5:
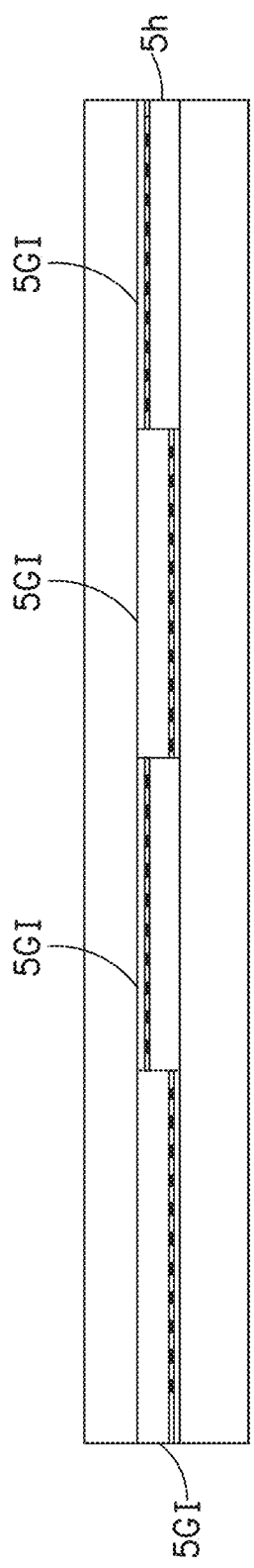
FIG. 5 is a diagram illustrating regions of interest analyzed from the general image illustrated in FIG. 4 in accordance with the proposed solution.
Figure 6:
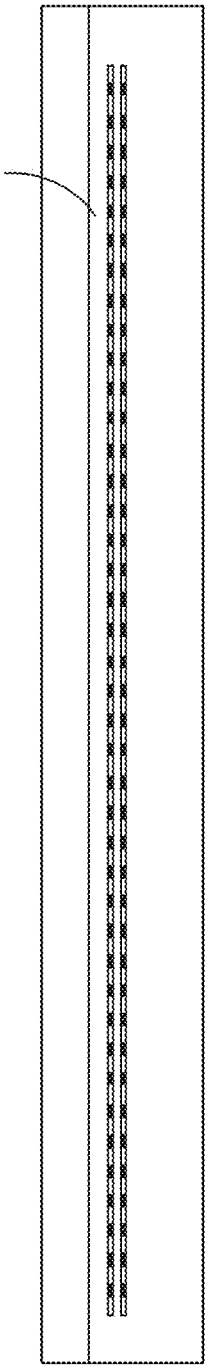
FIG. 6 is a diagram illustrating one analyzed region from FIG. 5 zoomed-in in accordance with the proposed solution.

Vision system C makes repeated image acquisitions, block 310, into image cache storage (such as of the controller processor), for example triggered by an input conveyor encoder or alternatively by a stepper motor drive circuit advancing at least one of the conveyors B and J. FIG. 4 illustrates a representative example of what may be referred to as a raw acquired image obtained (with the imager of the camera) at a given encoder index value, such as may be generated for a four light sources (e.g. as may be used in either light source(s) F, H) and one camera system (e.g. camera system(s) G, I) implementation. The image includes subregions of illuminated and unilluminated (unexposed) pixels 4GI, 4GV. The image analysis computer program algorithm does not consider the complete acquisition region of the camera image sensor where the pixels are not exposed. Instead, a specific subregion 4GI, for example having a height 4H of 3 pixels and of the complete light sheet width 4W, is considered. FIG. 5 illustrates regions considered 5GI (such as may correspond to such light source), identified with doted rectangles representing registered image subregions 5L, processed the image analyzer. FIG. 6 shows a detail of one specific region 6GI enlarged to better illustrate the region being considered by the image analysis algorithm.

For each acquired image (FIG. 4), the image analysis algorithm compares block 320, pixel light intensity of pixels in the specific region 5h (FIG. 5) being analyzed with a normalized intensity value obtained from a comparable subregion sample, for example from 10 raw baseline sample images. With reference to FIG. 3, the normalizing baseline may be a rolling baseline wherein at each image acquisition step 320 (in which there is no potential detection as will be described), the oldest image in the sample is deleted from registry or erased and replaced by a newly acquire draw image 322. The number of images used in the baseline sample can be modified. The normalized intensity value can be representative of an ambient lighting level, for example accounting for lighting condition changes in the surrounding environment of the cased goods inspection system, and the presence of dust, liquid residues or small debris on the optical receptor.

Using, for description purposes, the image acquired from the camera system G located below the conveyors B and J, the controller verifies 330 whether the number of pixels in a considered portion of an acquired image (registered by at least one or if desired, acquired images registered by both camera's G, I) which have a drop in intensity of more than, for example, about 40% compared to the normalized intensity value, and that represent a width of, for example, about 30 mm or more from the full width of the illumination sheet captured by the acquired image. As may be realized, the width referred to herein as the threshold width of reduced intensity portions of the acquired image may be set as desired based on environmental conditions. The reduced intensity width of the image portion corresponds to and is the result of a spatial intensity reduction caused by sustained, over the duration of acquired image(s), disruption and/or obstruction or block of at least a portion of the input beam(s) forming the illumination sheet, such as due to an object, that may be opaque or translucent in part passing through the beam/sheet. In other words, passage of product, case and/or wrapping through the sheet produces what may also be referred to as a gray level image for at least part of the acquired image width. If this is the case, the controller considers that there is a potential detection 332 of a product. The threshold value (both threshold width and threshold intensity variance) of the drop in intensity may be modified as desired (for example intensity drop threshold may be 10% drop from normalized). As may be realized, both thresholds settings are determinative of portion of opaque or translucent material in the illumination sheet, the disruption thereof resulting in a gray image in which such material is both detectable and measurable as will be further described (and the threshold width may be about 5 mm). By comparison, a wholly opaque material will reflect resulting in substantially complete obstruction of illumination and consequently in the relevant portion of the, or the graphic projection image.

The above process steps 310-340 are repeated as long as the number of pixels in a given acquired image, which have a drop in intensity of more than the predetermined threshold intensity drop (that may also be represented as an absolute intensity value threshold), for example, about 40%, and represents a width greater than the predetermined threshold width of, for example, about 30 mm or more and the process stops when this condition is not true anymore. While this first condition is true (established by exceeding both thresholds), if the number of images that meet this condition represents a potential product length of about 60 mm (as may be determined by a suitable encoder synchronizing acquisition rate, identifying conveyor displacement and rate so as to be correlated or proportional to acquired images and/or image frames) or more, the controller considers that a product was detected, or in other words, confirming detection as true 336 (the potential product length for confirmation of product may be set more or less, such as 10 mm of displacement. In this case, the controller combines previously acquired upstream images representing, for example, 60 mm of conveyor displacement (the representative length may be more or less, e.g. 10 mm) in front of the image setting the detection of the detected product, the number of images in which product was detected, and subsequently acquired downstream images representing, for example, 60 mm of conveyor displacement after the product detection assertion, from both camera systems I and G, to construct 340, a composite contiguous complete combined image of the product from the series of images acquired during the aforementioned durations before and after product detection (the duration(s) pre and/or post detection) may be varied and need not be symmetrical. If the number of images that meet the first and second conditions (i.e. threshold and duration 330, 336) represent a potential product less than, for example, 60 mm in width/length, the controller asserts that the detection 337 was a false detection, or that the detected product is below the minimal accepted length/width the image acquisition process continues normally. This system is robust to noise or parasitic signals like falling debris.

As noted, while both conditions are asserted, contiguous construction of the combined image (or pseudo image) of the scanned product continues past, for example, 60 mm until a maximum accepted product dimension is reached. In other words, upon controller determination that acquired image(s) (corresponding to desired conveyor travel, 60 mm) for example, of camera system G (through such determination maybe effected from acquired images if both cameras G, I) no longer satisfies the above noted thresholds (e.g. the considered portion of the acquired images have neither the width nor an intensity drop, greater than the set thresholds (e.g. 30 mm, 40% drop)), the controller registers the accepted product dimension (such as from the registered conveyor displacement from the encoder coincident with image acquisitions that exceed thresholds). Accordingly, the controller (via suitable programming) effects raw image acquisition for combination into the scanned product combined image may continue for another, for example, 60 mm after the maximum accepted product dimension was surpassed. It is understood, that the "combined image" (or pseudo image) and the "combined product image" correspond to the relative positions and orientations of illumination sources and include images of substantially orthogonal sides of the product such as a side and a top view images.

Figure 7:
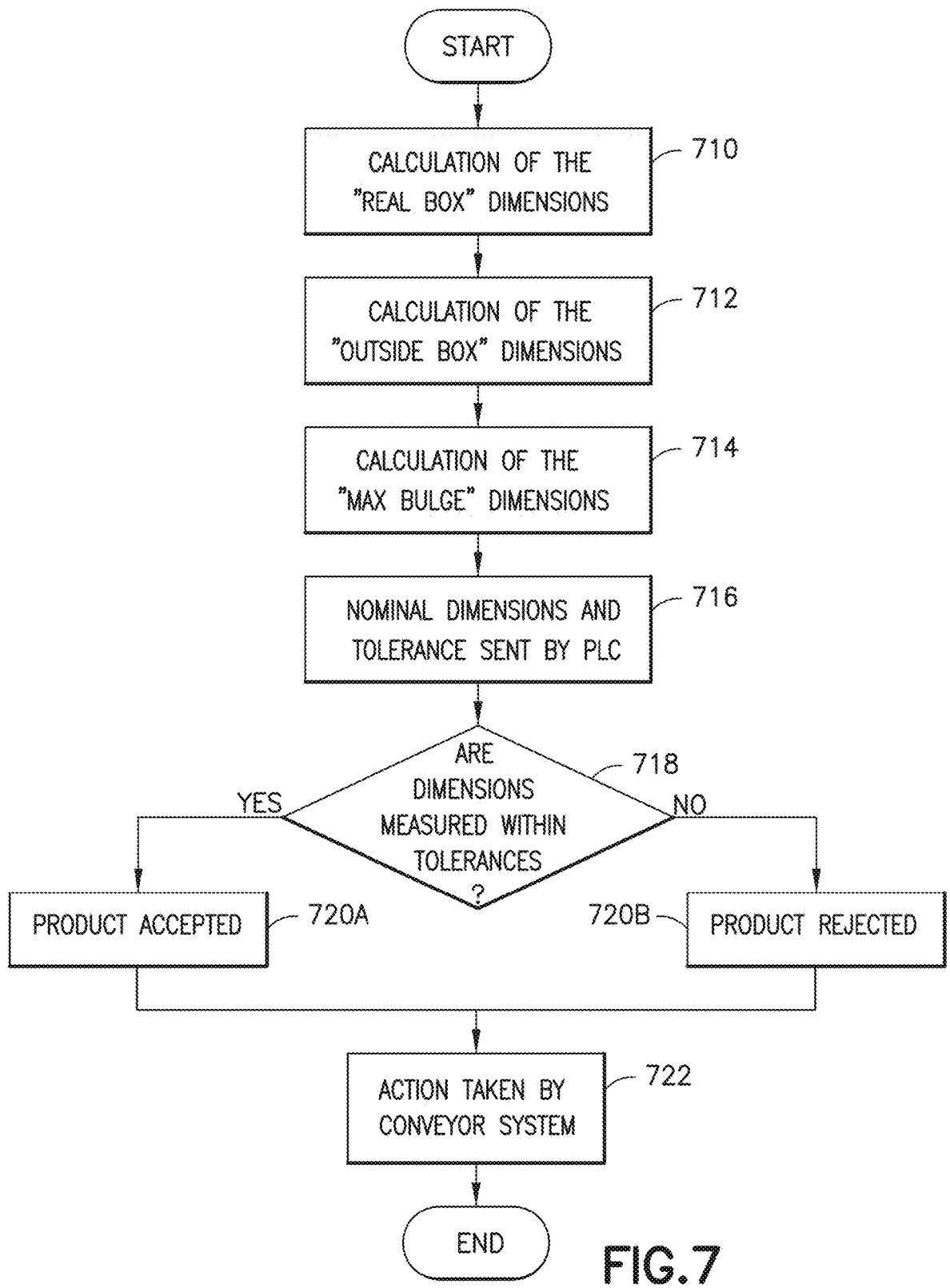
FIG. 7 is schematic chart illustrating a product measurement process flow diagram in accordance with the proposed solution.
Figure 8:
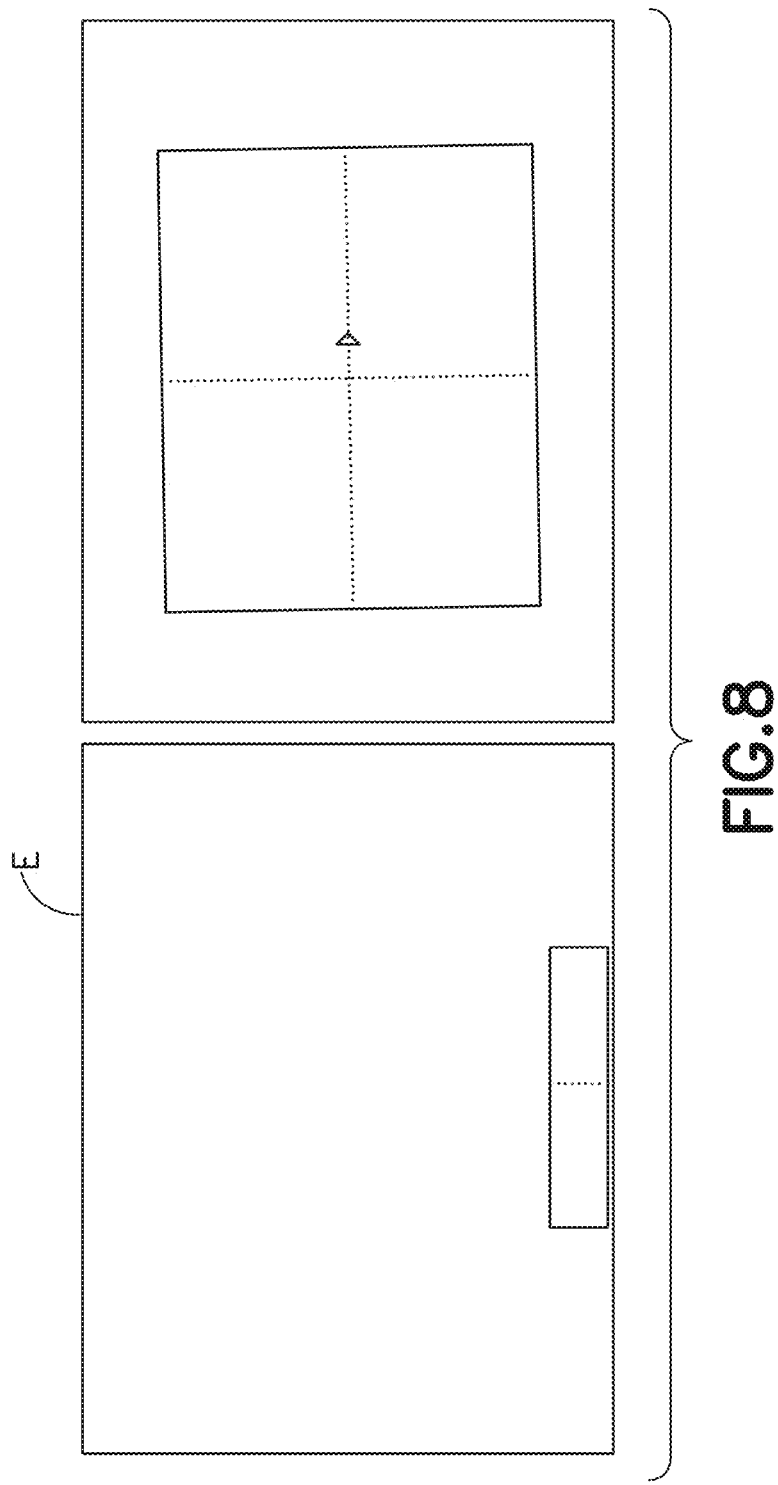
FIG. 8 is a schematic diagram illustrating in side and top views product measurement results obtained by the processes of FIGS. 3 and 7 in accordance with the proposed solution.

Once, and if desired substantially coincident with processor construct of the composite image(s) of a complete image product as noted, the controller calculates a variety of quantitative measurements by process steps illustrated in FIG. 7. With reference to FIG. 8, examples of quantitative measurements include: "real box", "max box", "max bulge", "orientation angle" and "distance from one side of the conveyor".

Figure 9:
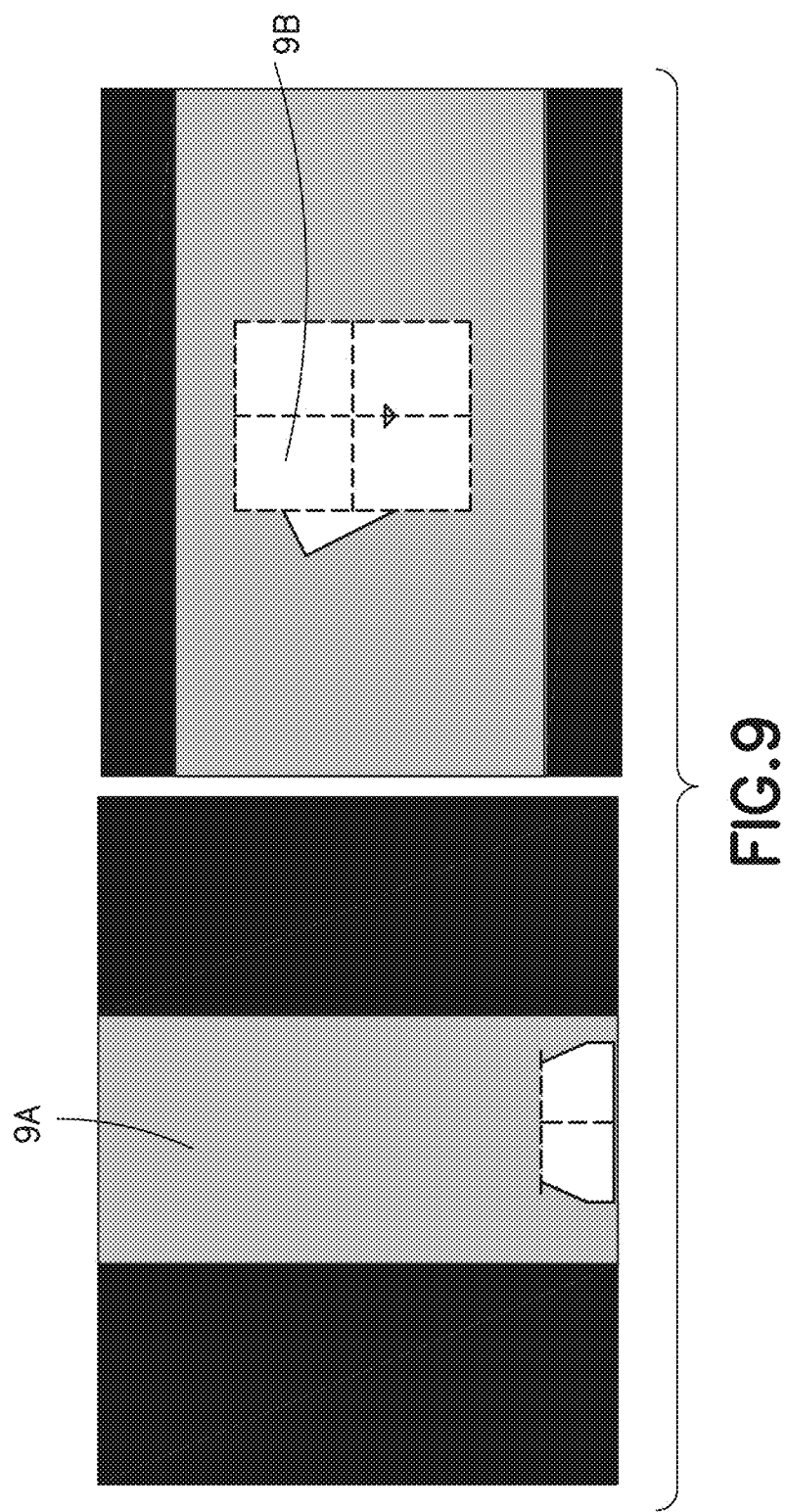
FIG. 9 is a schematic diagram illustrating in side and top views real box product measurements obtained by the processes of FIGS. 3 and 7 in accordance with the proposed solution.

"Real box" measurements, block 710 include dimensions of the best fit shape which can be determined based on, or obtained from, the combined product image. For example, the shape employed in the fit is a box having a length, width and height. Alternatively, the shape employed can be a sphere having a center and a radius. Various other shapes can be employed in the fit, such as but not limited to a cylinder, ovaloid, cone, etc. FIG. 9 illustrates and example of "real box" measurements (shown with the dotted lines on the processed images 9A, 9B respectively representing elevations and plan combined images) obtained from composite images acquired/combined/constructed during the inspection of the product shown on FIG. 2. As it can be seen in this example, any protrusion seen by the vision system C is not regarded as such when the "real box" dimensions are determined. In the example, the label L on the cased goods illustrated representative product as illustrated in FIG. 2 is partially detached and is detected in the confined image and resolved as part of the best fit shape determination so as to be ignored in the footprint evaluation. Nonetheless, opaque or translucent materials wraps for example, embodied in the composite material, are included in real box measurements to the extent conformal to the best fit shape.

Figure 10:
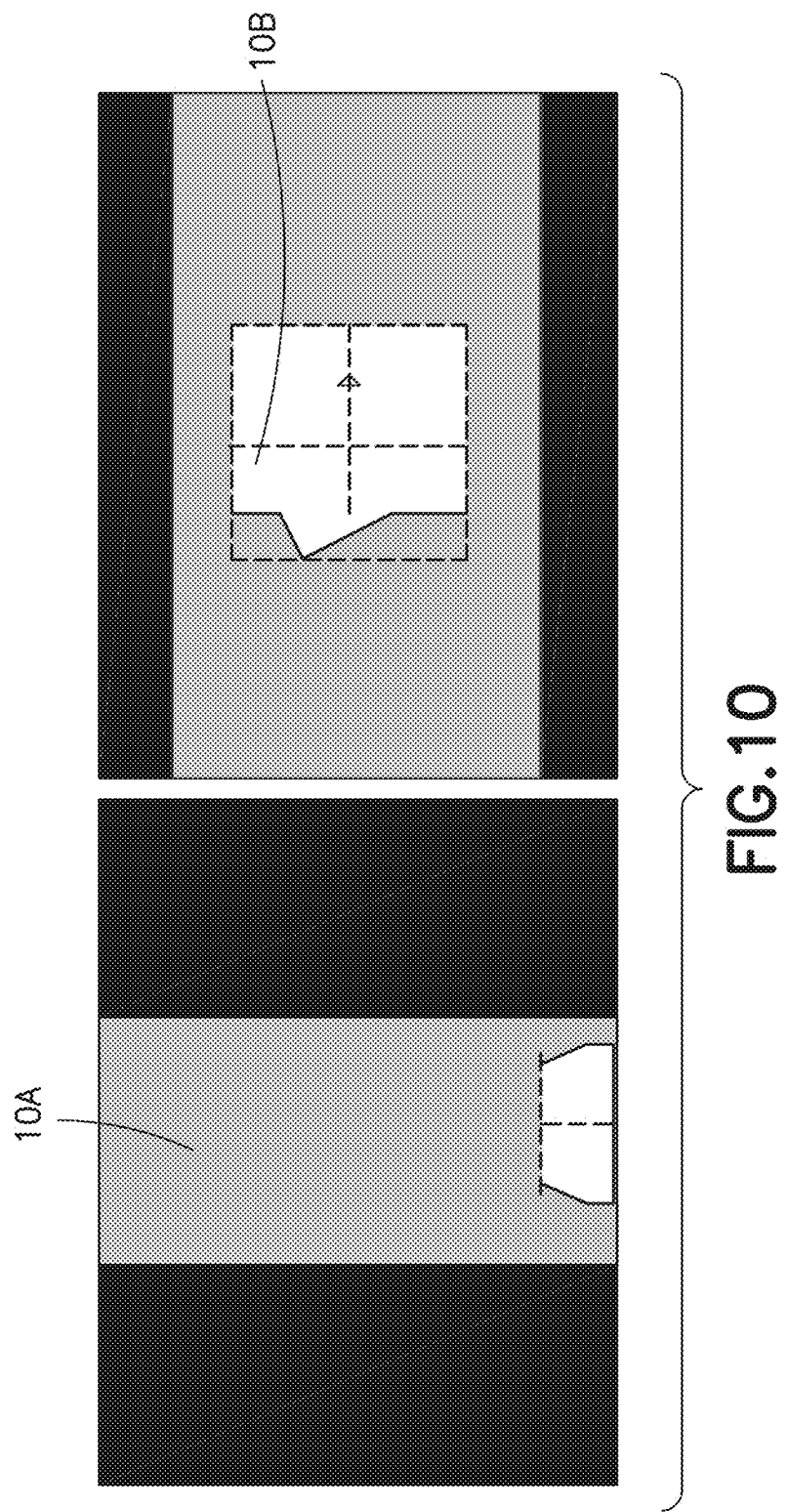
FIG. 10 is a schematic diagram illustrating in side and top views outside box product measurements obtained by the processes of FIGS. 3 and 7 in accordance with the proposed solution.

"Outside box" measurements, block 712 include dimensions of the smallest shape that contains the entire product which can be determined based on, or obtained from, the combined product image (as may include protrusions seen by the vision system including distressed product portion, labels and wrapping). For example, the shape employed in the fit is a box having a length, width and height indicative of the largest rectangular footprint of the product A on the conveyor B/J. Alternatively, the shape employed can be a sphere having a center and a radius. Various other shapes can be employed in the fit, such as but not limited to a cylinder, ovaloid, cone, etc. FIG. 10 illustrates and example of "outside box" measurements obtained from the images (10A, 10B respectively representing (evaluation and plan combined images) acquired/combined/constructed during the inspection of the product shown on FIG. 2 (shown with the dotted lines on the processed image). As it can be seen in this example, any protrusion imaged by the vision system C including such gray image projecting parts indicative of translucent or opaque wrapping, is considered and included when the "outside box" dimensions are determined. In the example, the partially detached label L on the cased goods product A illustrated in FIG. 2 dominates in determining the footprint of product A.

Figure 11:
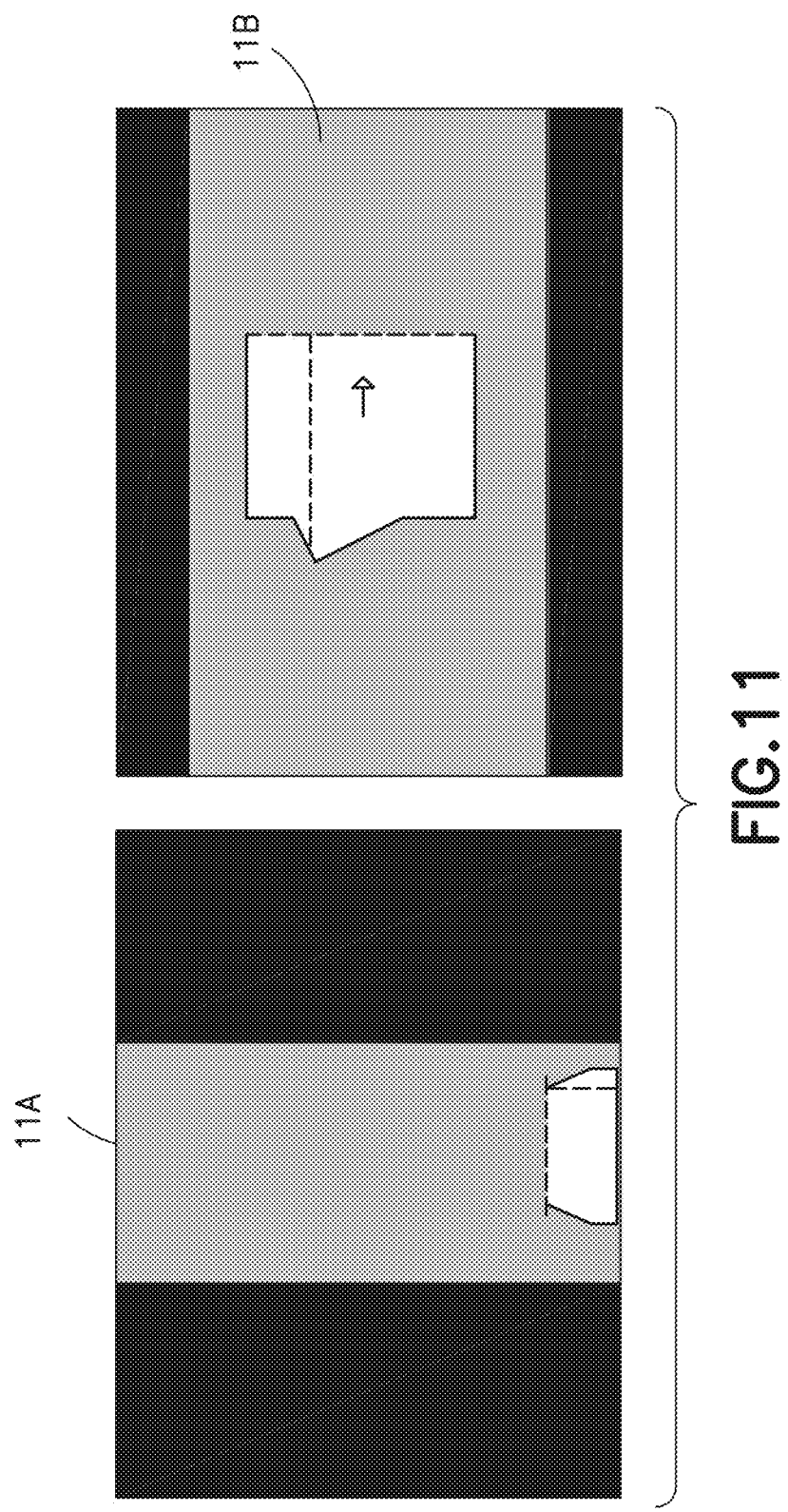
FIG. 11 is a schematic diagram illustrating in side and top views max bulge measurements obtained by the processes of FIGS. 3 and 7 in accordance with the proposed solution.
Figure 12:
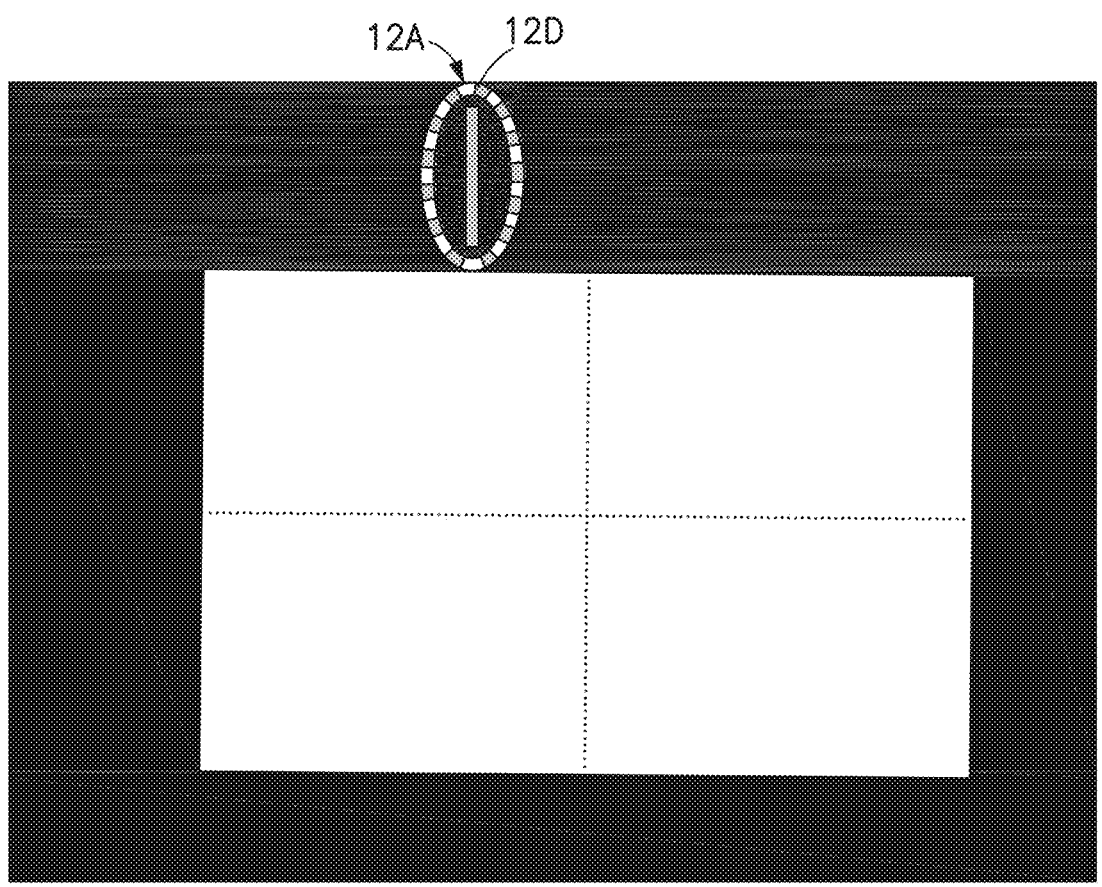
FIG. 12 is a diagram illustrating detection of the presence of debris on a camera system window in accordance with the proposed solution,
wherein similar features bear similar labels throughout the drawings. References to "top" and "bottom" qualifiers in the present specification is made solely with reference to the orientation of the drawings as presented in the application and do not imply any absolute spatial orientation.

The "max bulge" measurement block 714 is the longest dimension obtained from the product A being inspected. FIG. 11 illustrates a "max bulge" measurement obtained from the images 11A, 11B (with similar conventions to FIGS. 9, 10) acquired/combined/constructed during the inspection of the product shown on FIG. 2. Once the orientation of the product is determined, the "max bulge" is the biggest caliper measure in width, in length and in height.

The product "orientation angle" is the angle of the product's main axis relative to the travel direction of product A on the conveyors B/J. FIG. 8 best illustrates a non-zero product "orientation angle" determined when a box is employed for the best fits. Without limiting the invention, the "orientation angle" measurement can be a major axis when an ovaloid shape is employed in the fits.

With reference to FIG. 8, a "distance from one side of the conveyor" is determined as the minimum distance obtained between the product and either of the predetermined conveyor sides (as expressed based on the width of the light sheet, see FIG. 6).

For certainty, the proposed solution is not limited to performing the steps illustrated in FIGS. 3 and 7 in the sequence illustrated. Determination of measurements, as well as condition testing, are preferably performed in parallel, for example ascertained as the conveyors B/J advance. The sequence of steps illustrated in FIGS. 3 and 7 can illustrate a hierarchy of a coded logic decision network.

Once a substantial number of the above mentioned measurements are determined, the image analysis computer program compares them in block 718 with nominal values and accepted tolerances provided in block 716 to the cased goods inspection system. For example, a Programmable Logic Controller (PLC) (not shown) can provide at least some of the nominal values and accepted tolerances for the given case inspected by the inspection system. According to preferences of the user, the "real box", the "outside box" or the "max bulge" can be considered to accept or reject product A.

The vision system C then sends its decision (accept or reject), 720A, 720B as well as the various measurements taken to another controller for subsequent use by the user 722. For example, at least conveyors B/J can be operated in a special way to retract or dump rejected product, alternatively paddles (not shown) can be actuated to deflect rejected product possibly onto another conveyor (not shown). In another implementation, large "orientation angles" can be reduced by actuating components of the cased goods inspection system For certainty, a decision to reverse conveyors B/J and rescan the product is not excluded from the scope of the proposed solution.

In accordance with a preferred embodiment, as it can be seen from the raw image example illustrated in FIG. 4, the recorded light intensity does vary within the acquired image. To establish a normalized baseline value of intensity as a comparison basis or reference, the intensity value of non-black pixels of a selectable number, for example, 10 sample images are considered. In one aspect, the intensity values of the 33% median images, for example from the selected number of sample images, are considered to establish the normalized value of pixel intensity. By doing so, signal noise, light interference, and the like, are eliminated in order to reduce false product detection or false measurements. The sample images providing the basis for determination of the normalized baseline value of intensity may be updated, or refreshed, on a rolling basis as previously noted resolving for ambient changes due to environmental variances, detritus on noted EM source and/or vision system components, etc.)

By using above mentioned process, the vision system C can automatically compensate for debris or the like being present on a window panel of the camera system I/G. When such situation arises, the raw constructed/combined image shows a narrow line of constant pixel intensity 12D as shown within stitched line 12A, in FIG. 12. Upon detection of a narrow line of pixels, a warning can be sent to the operator to alert of a need to clean the window. In the meantime, because of the normalization of the light intensity process described above, such debris can be gradually relocated or removed by the processor from the combined composite image of the product A constructed by the image processing algorithm within a few iterations (encoder steps, stepper motor steps, seconds, etc.) and therefore minimizing the impact on the operation of the cased goods inspection system.

In accordance with another preferred embodiment of the proposed solution, the cased goods inspection system is employed to inspect an array of goods at least partially encased in shrink wrap following the contour of goods in the array. For simple shaped goods, the acceptable "outside box" and "real box" dimensions are similar within tolerances. Allowance is provided for goods having a complex shapes (such as may include one or more nonlinearities in the shape) as may be formed by one or more simple shaped product placed in an ordered array within packaging (e.g. shrink wrapping)). For example, with reference to product illustrated in FIG. 2, acceptable "outside box" dimensions can be specified to consider bottle tops and caps (as may be determined from the side image) beyond bottle necks, while acceptable "real box" dimensions can be specified to consider bottle bodies only, thus resolving imaging effects from the wrapping that may be translucent or opaque. In this case the acceptable "outside box" and "real box" dimensions are generally dissimilar.

The capacity to detect semi-transparency is proves useful to ignore translucent or semi-transparent wrap bulge from the measurements. It is to be noted that many other modifications can be made to the cased goods inspection system described hereinabove and illustrated in the appended drawings. For example: it is to be understood that embodiments of the cased goods inspection system are not limited in their application to the details of construction and parts illustrated in the accompanying drawings and described hereinabove. Other embodiments can be foreseen and practiced in various ways. It is also to be understood that the phraseology or terminology used herein is for the purpose of description and not limitation.

While some reference is made herein to a "vision system", the invention is not limited to any single nor to any combination of camera systems operating in the millimeter wave, Infra Red, visual, microwave, X-ray, gamma ray, etc. spectra. While composite camera can be employed, separate spectrum specific camera can also be employed severally or in combination. Any reference to cased goods comprising food stuffs is incidental and not intended to limit the scope of the invention. For certainty, durable goods cased in metal shipping containers can be inspected via appropriate sizing of the cased goods inspection system and appropriate selection of vision systems operating in metal shell penetrating spectra (X-ray), including electromagnetic sources operating in corresponding spectra absorbable by the cased goods.

In accordance with one or more aspects of the disclosed embodiment, a scanner apparatus for cased goods inspection is provided. The scanner apparatus including at least one conveyor for advancing a case of goods past the scanner apparatus, at least one electromagnetic (EM) source configured to transmit a sheet of parallel propagating EM radiation illumination of predetermined width towards a vision system disposed to receive the EM radiation illumination from the at least one EM source, the vision system including a diffuser and at least one camera wherein the diffuser diffuses the EM radiation illumination received from the at least one EM source so that the at least one camera captures the predetermined EM radiation illumination sheet width in entirety, the at least one camera is configured to digitize images of at least a portion of the EM radiation illumination sheet so that the case of goods advanced by the at least one conveyor through the transmitted EM radiation illumination sheet cast a shadow thereon, and a processor operably coupled to the at least one conveyor and vision system and including an image acquisition component configured to acquire the digitized images as the case of goods is advanced past the at least one camera, and an image combiner configured to selectively combine acquired digitized images into a combined image based on sustained input beam spatial intensity reduction below a first threshold, wherein the processor is configured to determine from the combined image dimensional measurements about the case of goods including one or more of length, width, height, angle, "real box, "max box" and "max bulge".

In accordance with one or more aspects of the disclosed embodiment, the processor is configured so as to ascertain presence of the case of goods based on sustained input beam spatial intensity reduction below a second threshold discriminating presence of shrink wrap translucency disposed on product in the case of goods.

In accordance with one or more aspects of the disclosed embodiment, the at least one conveyor is configured to advance the case of goods at a rate of advance, the image acquisition component being configured to acquire the digitized images at an acquisition rate proportional to the rate of advance of the case of goods.

In accordance with one or more aspects of the disclosed embodiment, the image acquisition rate is synchronized by using an encoder or by a stepper motor drive circuit.

In accordance with one or more aspects of the disclosed embodiment, the at least one EM source includes a substantially point source lamp having an output light beam, an output beam shaper configured to redirect the output light beam into the sheet of collimated illumination having parallel light rays of the output light beam, and an optional mirror to reduce a foot print of the apparatus.

In accordance with one or more aspects of the disclosed embodiment, the image acquisition component includes an image cache storage.

In accordance with one or more aspects of the disclosed embodiment, the vision system is configured to determine an ambient light intensity from a sample buffer of cached images.

In accordance with one or more aspects of the disclosed embodiment, the vision system is configured to identify presence of debris on an input window of the vision system based on common pixels of same intensity across a number of digitized images.

In accordance with one or more aspects of the disclosed embodiment, the image combiner is configured to selectively combine acquired digitized images into a potential product combined image if a number of pixels digitized in an image having a reduced intensity below the first predetermined threshold define an image width greater than a second threshold.

In accordance with one or more aspects of the disclosed embodiment, the image combiner is configured to selectively combine acquired digitized images into forming the combined image if a number of pixels digitized across sequential images having reduced intensity below the first predetermined threshold and a second threshold represent a predetermined combined image length.

In accordance with one or more aspects of the disclosed embodiment, the processor is configured to determine dimensions from the combined image of: a first shape best fitting in the combined image, a second shape circumscribing the combined image, and differences between the first and second shapes.

In accordance with one or more aspects of the disclosed embodiment, the processor is configured to determine from the combined image an orientation angle of the case of goods with respect to the at least one conveyor.

In accordance with one or more aspects of the disclosed embodiment, the processor is configured to determine from the combined image a distance of the case of goods from one side of the at least one conveyor.

In accordance with one or more aspects of the disclosed embodiment, a method of inspecting cased goods is provided. The method includes advancing at least one case of goods on a conveyor, generating an illumination sheet of parallel illuminating rays with at least one electromagnetic source, capturing an image, formed by the illumination sheet passing through a diffuser, with at least one camera located so as to capture illumination from diffused parallel rays of the illumination sheet, where the image embodies a cased goods image that is generated by the case of goods moving between the at least one electromagnetic source and the at least one camera, where part of the parallel sheet of illumination is at least partially blocked by the case of goods, thus generating a gray level image.

In accordance with one or more aspects of the disclosed embodiment, capturing comprises capturing a number of serial images, each new image is compared with a normalized intensity from a predetermined number of previously acquired images, and a cased goods is detected, with a processor, when there is a drop of intensity more than a predetermined threshold.

In accordance with one or more aspects of the disclosed embodiment, a combined image of the cased goods is constructed with the processor by adding a series of images.

In accordance with one or more aspects of the disclosed embodiment, various characteristics of the cased goods are computed based on the combined image of the cased goods including one or more of the length, the width, the height, the angle, the "real box", the "max box" and the "max bulge"

In accordance with one or more aspects of the disclosed embodiment, a scanner apparatus for cased goods inspection is provided. The scanner apparatus includes at least one conveyor for advancing a case of goods past the scanner apparatus, at least one electromagnetic (EM) source configured to transmit a sheet of parallel propagating EM radiation illumination of predetermined width towards a vision system disposed to receive the EM radiation illumination from the at least one EM source, the vision system including a diffuser and at least one camera wherein the diffuser diffuses the EM radiation illumination received from the at least one EM source so that the at least one camera captures the predetermined EM radiation illumination sheet width in entirety, the at least one camera is configured to digitize images of at least a portion of the EM radiation illumination sheet so that the case of goods advanced by the at least one conveyor through the transmitted EM radiation illumination sheet cast a shadow thereon, and a processor operably coupled to the at least one conveyor and visions system and including an image acquisition component configured to acquire the digitized images as the case of goods is advanced past the camera, and an image combiner configured to selectively combine acquired images into a combined image based on sustained input beam spatial intensity reduction below a first threshold, wherein the processor is configured so as to ascertain presence of the case of goods based on sustained input beam spatial intensity reduction below a second threshold discriminating presence of shrink wrap translucency desired on product in the case of goods.

In accordance with one or more aspects of the disclosed embodiment, the processor is configured to determine from the combined image dimensional measurements about the case of goods including one or more of length, width, height, angle, "real box, "max box" and "max bulge".

In accordance with one or more aspects of the disclosed embodiment, the at least one conveyor is configured to advance the case of goods at a rate of advance, the image acquisition component being configured to acquire the digitized images at an acquisition rate proportional to the rate of advance of the case of goods, and wherein the image acquisition rate is synchronized by using an encoder or by a stepper motor drive circuit.

In accordance with one or more aspects of the disclosed embodiment, the at least one EM source includes a substantially point source lamp having an output light beam, an output beam shaper configured to redirect the output light beam into the sheet of collimated illumination having parallel light rays of the output light beam, and an optional mirror to reduce a foot print of the apparatus.

In accordance with one or more aspects of the disclosed embodiment, the vision system is configured to identify presence of debris on an input window of the vision system based on common pixels of same intensity across a number of digitized images.

In accordance with one or more aspects of the disclosed embodiment, the image combiner is configured to selectively combine acquired digitized images into a potential product combined image if a number of pixels digitized in an image having a reduced intensity below the first predetermined threshold define an image width greater than a second threshold.

In accordance with one or more aspects of the disclosed embodiment, the processor is configured to determine dimensions from the combined image of: a first shape best fitting in the combined image, a second shape circumscribing the combined image, and differences between the first and second shapes.

While the invention has been shown and described with reference to preferred embodiments thereof, it will be recognized by those skilled in the art that various changes in form and detail may be made therein without departing from the spirit and scope of the invention as defined by the appended claims.

What is claimed is:

1. An inbound conveyor apparatus for induction of case goods in a logistic facility, the inbound conveyor apparatus comprising:
   at least one conveyor for advancing a case of goods into the facility;
   a case inspection apparatus disposed for inspection of the cased goods advanced past the case inspection apparatus by the at least one conveyor;
   at least one electromagnetic (EM) source configured to transmit a sheet of parallel propagating EM radiation illumination of predetermined width towards a vision system disposed to receive the EM radiation illumination from the at least one EM source;
   the vision system with at least one camera wherein:
      the at least one camera is configured so as to capture the predetermined EM radiation illumination sheet width in entirety diffused by a diffuser, and
      the at least one camera is configured to digitize images of at least a portion of the EM radiation illumination sheet so that the case of goods advanced by the at least one conveyor through the transmitted EM radiation illumination sheet cast a shadow thereon; and
   a processor operably coupled to the at least one conveyor and vision system and including
      an image acquisition component configured to acquire more than one of the digitized images for each of the case of goods as the case of goods is advanced past the at least one camera, and
      an image combiner configured to selectively combine a number of acquired digitized images, different than the more than one of the digitized images, into a combined image based on sustained input beam spatial intensity reduction below a first threshold over a duration of the more than one of the acquired digitized images;
   wherein the processor is configured to determine from the combined image a predetermined characteristic intrinsic to the case of goods.

2. The apparatus as claimed in claim 1, wherein the processor is configured to determine from the combined image dimensional measurements about the case of goods including one or more of length, width, height, angle, "real box, "max box" and "max bulge".

3. The apparatus as claimed in claim 1, where the processor is configured to ascertain presence of the case of goods based on sustained input beam spatial intensity reduction below a second threshold discriminating presence of translucent shrink wrap disposed on product in the case of goods.

4. The apparatus as claimed in claim 1, wherein the at least one conveyor is configured to advance the case of goods at a rate of advance, the image acquisition component being configured to acquire the digitized images at an acquisition rate proportional to the rate of advance of the case of goods.

5. The apparatus as claimed in claim 4, wherein the image acquisition rate is synchronized by using an encoder or by a stepper motor drive circuit.

6. The apparatus as claimed in claim 1, wherein the at least one EM source comprises:
   a substantially point source lamp having an output light beam;
   an output beam shaper configured to redirect the output light beam into the sheet of collimated illumination having parallel light rays of the output light beam; and
   a mirror to reduce a foot print of the apparatus.

7. The apparatus as claimed in claim 1, wherein the image acquisition component comprises an image cache storage.

8. The apparatus as claimed in claim 1, wherein the vision system is configured to determine an ambient light intensity from a sample buffer of cached images.

9. The apparatus as claimed in claim 1, wherein the vision system is configured to identify presence of debris on an input window of the vision system based on common pixels of same intensity across a number of digitized images.

10. The apparatus as claimed in claim 1, wherein the image combiner is configured to selectively combine acquired digitized images into a potential product combined image where a number of pixels digitized in an image having a reduced intensity below the first predetermined threshold define an image width greater than a second threshold.

11. The apparatus as claimed in claim 1, wherein the image combiner is configured to selectively combine acquired digitized images into forming the combined image where a number of pixels digitized across sequential images having reduced intensity below the first predetermined threshold and a second threshold represent a predetermined combined image length.

12. The apparatus as claimed in claim 1, wherein the processor is configured to determine dimensions from the combined image of: a first shape best fitting in the combined image, a second shape circumscribing the combined image, and differences between the first and second shapes.

13. The apparatus as claimed in claim 1, wherein the processor is configured to determine from the combined image an orientation angle of the case of goods with respect to the at least one conveyor.

14. The apparatus as claimed in claim 1, wherein the processor is configured to determine from the combined image a distance of the case of goods from one side of the at least one conveyor.

15. A method of inspecting cased goods comprising:
   advancing at least one case of goods on a conveyor;
   generating an illumination sheet of parallel illuminating rays, having a predetermined width, less than a width of each of the case of goods, with at least one electromagnetic source;
   capturing an image, formed by the illumination sheet passing through a diffuser, with at least one camera located to capture illumination from diffused parallel rays of the illumination sheet;
   where the image embodies a cased goods image that is generated by the case of goods moving between the at least one electromagnetic source and the at least one camera, where part of the parallel rays of the illumination sheet is at least partially blocked by the case of goods, and the image generated spans the predetermined width of the illumination sheet and encompasses a gray scale image of part of the illumination sheet blocked by and transmitted through at least a portion of the case of goods.

16. The method as claimed in claim 15, where capturing comprises capturing a number of serial images, each new image is compared with a normalized intensity from a predetermined number of previously acquired images, and a cased goods is detected, with a processor, when there is a drop of intensity more than a predetermined threshold.

17. The method as claimed in claim 16, where a combined image of the cased goods is constructed with the processor by adding a series of images.

18. The method as claimed in claim 17, where various characteristics of the cased goods are computed based on the combined image of the cased goods including one or more of length, width, height, angle, "real box", "max box" and "max bulge".

19. The method of claim 15, wherein the gray scale image resolves imaging effects of a casing of the case of goods relative to the case of goods.

20. An inbound conveyor apparatus for induction of case goods in a logistic facility, the inbound conveyor apparatus comprising:
at least one conveyor for advancing a case of goods into the facility;
a case inspection apparatus for inspection of the cased goods advanced past the case inspection apparatus by the at least one conveyor;
at least one electromagnetic (EM) source configured to transmit a sheet of parallel propagating EM radiation illumination of predetermined width towards a vision system disposed to receive the EM radiation illumination from the at least one EM source;
the vision system with at least one camera wherein:
the at least one camera is configured so as to capture the predetermined EM radiation illumination sheet width in entirety diffused by a diffuser;
the at least one camera is configured to digitize images of at least a portion of the EM radiation illumination sheet so that the case of goods advanced by the at least one conveyor through the transmitted EM radiation illumination sheet cast a shadow thereon; and
a processor operably coupled to the at least one conveyor and vision system and including
an image acquisition component configured to acquire more than one of the digitized images for each of the case of goods as the case of goods is advanced past the camera, and
an image combiner configured to selectively combine a number of acquired digitized images, different than the more than one of the digitized images, into a combined image based on sustained input beam spatial intensity reduction below a first threshold over a duration of the more than one of the acquired digitized images;
wherein the processor is configured to ascertain presence of the case of goods based on sustained input beam spatial intensity reduction below a second threshold discriminating presence of translucent shrink wrap on product in the case of goods.

21. The apparatus as claimed in claim 20, wherein the processor is configured to determine from the combined image a predetermined characteristic intrinsic to the case of goods.

22. The apparatus as claimed in claim 20, wherein the processor is configured to determine from the combined image dimensional measurements about the case of goods including one or more of length, width, height, angle, "real box, "max box" and "max bulge".

23. The apparatus as claimed in claim 20, wherein the at least one conveyor is configured to advance the case of goods at a rate of advance, the image acquisition component being configured to acquire the digitized images at an acquisition rate proportional to the rate of advance of the case of goods, and wherein the image acquisition rate is synchronized by using an encoder or by a stepper motor drive circuit.

24. The apparatus as claimed in claim 20, wherein the at least one EM source comprises:
a substantially point source lamp having an output light beam;
an output beam shaper configured to redirect the output light beam into the sheet of collimated illumination having parallel light rays of the output light beam; and
a mirror to reduce a foot print of the apparatus.

25. The apparatus as claimed in claim 20, wherein the vision system is configured to identify presence of debris on an input window of the vision system based on common pixels of same intensity across a number of digitized images.

26. The apparatus as claimed in claim 25, wherein the image combiner is configured to selectively combine acquired digitized images into a potential product combined image if a number of pixels digitized in an image having a reduced intensity below the first predetermined threshold define an image width greater than a second threshold.

27. The apparatus as claimed in claim 20, wherein the processor is configured to determine dimensions from the combined image of a first shape best fitting in the combined image, a second shape circumscribing the combined image, and differences between the first and second shapes.

* * * * *

UNITED STATES PATENT AND TRADEMARK OFFICE
CERTIFICATE OF CORRECTION

| | |
|---|---|
| PATENT NO. | : 11,449,978 B2 |
| APPLICATION NO. | : 17/216803 |
| DATED | : September 20, 2022 |
| INVENTOR(S) | : Ducharme et al. |

It is certified that error appears in the above-identified patent and that said Letters Patent is hereby corrected as shown below:

On the Title Page

Item (73) Assignee should be "Symbotic Canada ULC"

Signed and Sealed this
Nineteenth Day of November, 2024

Katherine Kelly Vidal
*Director of the United States Patent and Trademark Office*